(12) United States Patent
Zhang et al.

(10) Patent No.: US 11,330,481 B2
(45) Date of Patent: May 10, 2022

(54) METHOD AND DEVICE FOR CONFIGURING MEASUREMENT PARAMETER

(71) Applicants: China Mobile Communication Co., Ltd Research Institute, Beijing (CN); China Mobile Communications Group Co., Ltd., Beijing (CN)

(72) Inventors: Xiaoran Zhang, Beijing (CN); Nan Hu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 57 days.

(21) Appl. No.: 16/608,914

(22) PCT Filed: Mar. 21, 2018

(86) PCT No.: PCT/CN2018/079704
§ 371 (c)(1),
(2) Date: Oct. 28, 2019

(87) PCT Pub. No.: WO2018/196508
PCT Pub. Date: Jan. 11, 2018

(65) Prior Publication Data
US 2021/0112465 A1    Apr. 15, 2021

(30) Foreign Application Priority Data

Apr. 28, 2017    (CN) .......................... 201710294062.1

(51) Int. Cl.
*H04W 36/00*    (2009.01)
*H04B 7/06*    (2006.01)
(Continued)

(52) U.S. Cl.
CPC ...... *H04W 36/0061* (2013.01); *H04B 7/0695* (2013.01); *H04L 5/0051* (2013.01);
(Continued)

(58) Field of Classification Search
CPC ....... H04W 36/0061; H04W 36/00835; H04W 24/10; H04W 36/0094; H04W 56/001; H04W 92/20; H04B 7/0695; H04L 5/0051
See application file for complete search history.

(56) References Cited

U.S. PATENT DOCUMENTS

2003/0095516 A1    5/2003    Ok et al.
2010/0081433 A1*   4/2010    Lee ........................ H04W 48/18
                                                       455/434
(Continued)

FOREIGN PATENT DOCUMENTS

CN    102271391 A    12/2011
CN    102300185 A    12/2011
(Continued)

OTHER PUBLICATIONS

The Impact of Beam Sweeping on RRM Measurement; 3GPP TSG RAN WG2 #97bis Spokane, USA, Apr. 3 to 7, 2017, 5 pages.
(Continued)

*Primary Examiner* — Deepa Belur
(74) *Attorney, Agent, or Firm* — Price Heneveld LLP (57) ABSTRACT

The present disclosure provides a method and a device for configuring one or more measurement parameters. The method is applied to a base station, and includes acquiring signal transmission information from a neighboring cell. The signal transmission information includes first information about the transmission of a synchronization signal and/or second information about the transmission of a reference signal for beam measurement. According to the
(Continued)

present disclosure, it is able to solve the problem in the related art where it is impossible for a conventional measurement gap configuration mechanism to ensure that a UE is capable of successfully receiving a signal from a neighboring cell.

17 Claims, 2 Drawing Sheets

(51) Int. Cl.
  *H04L 5/00* (2006.01)
  *H04W 24/10* (2009.01)
  *H04W 56/00* (2009.01)
  *H04W 92/20* (2009.01)
(52) U.S. Cl.
  CPC ....... *H04W 24/10* (2013.01); *H04W 36/0094* (2013.01); *H04W 36/00835* (2018.08); *H04W 56/001* (2013.01); *H04W 92/20* (2013.01)

(56) References Cited

U.S. PATENT DOCUMENTS

| | | | |
|---|---|---|---|
| 2013/0010658 A1 | 1/2013 | Zhu | |
| 2015/0181450 A1 | 6/2015 | Xin et al. | |
| 2015/0304868 A1* | 10/2015 | Yu | H04B 7/0617 370/312 |
| 2015/0312784 A1 | 10/2015 | You et al. | |
| 2016/0218786 A1 | 7/2016 | Mizusawa | |
| 2016/0323075 A1* | 11/2016 | Jeong | H04L 5/0023 |
| 2017/0006564 A1* | 1/2017 | Gou | H04W 56/00 |
| 2017/0141894 A1* | 5/2017 | Wei | H04L 5/0048 |
| 2017/0325244 A1 | 11/2017 | Zhang et al. | |
| 2018/0192432 A1* | 7/2018 | Tenny | H04W 72/1289 |
| 2019/0215123 A1* | 7/2019 | Zhou | H04W 72/005 |
| 2020/0119800 A1* | 4/2020 | Rune | H04W 76/28 |

FOREIGN PATENT DOCUMENTS

| | | | |
|---|---|---|---|
| CN | 102547797 A | 7/2012 | |
| CN | 102740385 A | 10/2012 | |
| CN | 103686781 A | 3/2014 | |
| CN | 103856894 A | 6/2014 | |
| CN | 105557049 A | 5/2016 | |
| CN | 105657730 A | 6/2016 | |
| CN | 106233646 A | 12/2016 | |
| EP | 3242506 A1 | 1/2015 | |
| WO | 2015133823 A1 | 9/2015 | |
| WO | 2016115710 A1 | 7/2016 | |
| WO | 2017054432 A1 | 4/2017 | |
| WO | WO-2018078858 A1 * | 5/2018 | ............ H04W 16/28 |
| WO | WO-2018196508 A1 * | 11/2018 | ............ H04L 5/0048 |
| WO | WO-2020029249 A1 * | 2/2020 | ........ H04W 72/0446 |

OTHER PUBLICATIONS

Measurement gap for NR; 3GPP TSG-RAN WG2 Meeting #97bis Spokane, WA, USA, Apr. 3-7, 2017, 3 pages.

* cited by examiner

METHOD AND DEVICE FOR CONFIGURING MEASUREMENT PARAMETER

CROSS-REFERENCE TO RELATED APPLICATION

The present application is the U.S. national phase of PCT Application No. PCT/CN2018/079704 filed on Mar. 21, 2018, which claims a priority of the Chinese patent application 201710294062.1 filed on Apr. 28, 2017, which are incorporated herein by reference in their entirety.

TECHNICAL FIELD

The present disclosure relates to the field of communication technology, in particular to a method and a device for configuring one or more measurement parameters.

BACKGROUND

For a $5^{th}$-Generation (5G) mobile communication technology, it is necessary to cope with a large path loss and a large penetration loss through massive antennae at a high frequency band. Considering the cost, complexity and performance, analog-digital hybrid beamforming architecture is most likely to be adopted by the 5G high-frequency massive antennae. In the analog-digital hybrid beamforming architecture, each cell is covered by a plurality of analog beams, and each analog beam merely changes its direction in a time domain. This new characteristic introduced by the analog-digital hybrid beamforming architecture may bring a significant influence on the design of a 5G system, especially on Radio Resource Management (RRM) measurement.

It is necessary to configure a measurement gap when measurement is performed by a User Equipment (UE). Within the measurement gap, the UE needs to stop uplink/downlink transmission in a serving cell, and measure a neighboring cell. In a Long Term Evolution (LTE) system, the measurement gap is configured as 6 ms, where it takes 5 ms to detect a synchronization signal and a cell-specific reference signal (CSRS), and 1 ms to adjust a radio frequency (RF) link. A measurement period may be 40 ms or 80 ms.

In the 5G system, the analog beam is transmitted by a base station, and the direction of the analog beam is changed through beam scanning in a time division manner, so as to cover the cells. The synchronization signal or any other reference signal for beam measurement is transmitted in a time division manner. Hence, during the configuration of the measurement gap, it is necessary to ensure that the UE is capable of successfully receiving the synchronization signal or the other reference signal for beam measurement from the neighboring cell. However, the synchronization signals or the reference signals for beam measurement from a plurality of to-be-measured neighboring cells may have different transmission times and transmission periods, so it is necessary to re-design the measurement gap for the 5G system. For example, a first cell is covered by five analog beams in a time division manner, and a scanning time period for the first cell is 5 ms. When the UE is merely capable of successfully detecting a signal transmitted through a fifth analog beam, the measurement gap must be greater than 5 ms, so as to ensure that the UE is capable of receiving a synchronization signal transmitted through the fifth analog beam. Identically, when a scanning time period for a second cell is 6 ms, the measurement gap must be greater than 6 ms, so as to ensure that the UE is capable of successfully detecting a synchronization signal from the second cell. At this time, a neighboring cell measurement order for the UE is determined on the basis of an algorithm, so the measurement gap configured for the UE must be greater than 6 ms, so as to ensure that the UE is capable of detecting the first cell and the second cell.

In a word, it is impossible for a conventional measurement gap configuration mechanism to ensure that the UE is capable of successfully receiving a signal from the neighboring cell.

SUMMARY

An object of the present disclosure is to provide a method and a device for configuring one or more measurement parameters, so as to solve the problem in the related art where it is impossible for the conventional measurement gap configuration mechanism to ensure that the UE is capable of successfully receiving the signal from the neighboring cell.

In one aspect, the present disclosure provides in some embodiments a 5G-network signal interaction method for a base station, including acquiring signal transmission information from a neighboring cell. The signal transmission information includes first information about the transmission of a synchronization signal and/or second information about the transmission of a reference signal for beam measurement.

In some possible embodiments of the present disclosure, the first information includes a scanning time and a scanning period for the transmission of the synchronization signal, and the second information includes a scanning time and a scanning period for the transmission of the reference signal for beam measurement.

In some possible embodiments of the present disclosure, the acquiring the signal transmission information from the neighboring cell includes: transmitting request information for requesting the signal transmission information to the neighboring cell; and receiving the signal transmission information transmitted by the neighboring cell in accordance with the request information.

In some possible embodiments of the present disclosure, the neighboring cell is recorded in a neighboring cell list. The signal interaction method further includes: determining whether neighboring cells in the neighboring cell list are changed; when a new neighboring cell is added into the neighboring cell list, acquiring signal transmission information from the new neighboring cell; and when a neighboring cell in the neighboring cell list is deleted, deleting the signal transmission information corresponding to the deleted neighboring cell.

In some possible embodiments of the present disclosure, subsequent to acquiring the signal transmission information from the neighboring cell, the signal interaction method further includes configuring one or more measurement parameters for the measurement of a signal from the neighboring cell for a UE in a serving cell in accordance with the signal transmission information from the neighboring cell.

In some possible embodiments of the present disclosure, the configuring the measurement parameter for the measurement of a signal from the neighboring cell for the UE in the serving cell in accordance with the signal transmission information from the neighboring cell includes configuring a measurement gap and/or a measurement period for the UE in the serving cell in accordance with the signal transmission information.

In another aspect, the present disclosure provides in some embodiments a method for measuring a measurement parameter for use in a base station, including configuring the measurement parameter for the measurement of a signal from a neighboring cell for a UE in a serving cell in accordance with signal transmission information from the neighboring cell. The signal transmission information includes first information about the transmission of a synchronization signal and/or second information about the transmission of a reference signal for beam measurement.

In some possible embodiments of the present disclosure, the first information includes a scanning time and a scanning period for the transmission of the synchronization signal, and the second information includes a scanning time and a scanning period for the transmission of the reference signal for beam measurement.

In some possible embodiments of the present disclosure, the method further includes: transmitting request information for requesting the signal transmission information to the neighboring cell; and receiving the signal transmission information transmitted by the neighboring cell in accordance with the request information.

In some possible embodiments of the present disclosure, the configuring the measurement parameter for the measurement of the signal from the neighboring cell for the UE in the serving cell in accordance with the signal transmission information from the neighboring cell includes: configuring a measurement gap for the UE in the serving cell in accordance with the scanning time for the transmission of the synchronization signal and/or the scanning time for the transmission of the reference signal for beam measurement; and/or configuring a measurement period for the UE in the serving cell in accordance with the scanning period for the transmission of the synchronization signal and/or the scanning period for the transmission of the reference signal for beam measurement.

In some possible embodiments of the present disclosure, the configuring the measurement gap for the UE in the serving cell in accordance with the scanning time for the transmission of the synchronization signal and/or the scanning time for the transmission of the reference signal for beam measurement includes: when the signal transmission information merely includes the first information, determining a sum of a maximum value of scanning times for the transmission of synchronization signals corresponding to all neighboring cells and a radio frequency channel adjustment time as the measurement gap of the UE; when the signal transmission information merely includes the second information, determining a sum of a maximum value of scanning times for the transmission of reference signals for beam measurement corresponding to all neighboring cells and the radio frequency channel adjustment time as the measurement gap of the UE; and when the signal transmission information includes both the first information and the second information, determining a sum of a maximum value of the scanning times for the transmission of the synchronization signals and the scanning times for the transmission of the reference signals for beam measurement corresponding to all neighboring cells and the radio frequency channel adjustment time as the measurement gap of the UE.

In some possible embodiments of the present disclosure, the configuring the measurement period for the UE in the serving cell in accordance with the scanning period for the transmission of the synchronization signal and/or the scanning period for the transmission of the reference signal for beam measurement includes: when the signal transmission information merely includes the first information, determining a greatest common divisor or a least common multiple of scanning periods for the transmission of synchronization signals corresponding to all neighboring cells as the measurement period of the UE; when the signal transmission information merely includes the second information, determining a greatest common divisor or a least common multiple of scanning periods for the transmission of reference signal for beam measurement corresponding to all neighboring cells as the measurement period of the UE; and when the signal transmission information includes both the first information and the second information, determining a greatest common divisor or a least common multiple of the scanning periods for the transmission of the synchronization signals and the scanning periods for the transmission of the reference signals for beam measurement corresponding to all neighboring cells as the measurement period of the UE.

In yet another aspect, the present disclosure provides in some embodiments a 5G-network signal interaction device for a base station, including an acquisition module configured to acquire signal transmission information from a neighboring cell. The signal transmission information includes first information about the transmission of a synchronization signal and/or second information about the transmission of a reference signal for beam measurement.

In some possible embodiments of the present disclosure, the first information includes a scanning time and a scanning period for the transmission of the synchronization signal, and the second information includes a scanning time and a scanning period for the transmission of the reference signal for beam measurement.

In some possible embodiments of the present disclosure, the acquisition module includes: a transmission unit configured to transmit request information for requesting the signal transmission information to the neighboring cell; and a reception unit configured to receive the signal transmission information transmitted by the neighboring cell in accordance with the request information.

In some possible embodiments of the present disclosure, the neighboring cell is recorded in a neighboring cell list. The signal interaction device further includes: a determination module configured to determine whether neighboring cells in the neighboring cell list are changed; and an information processing module configured to, when a new neighboring cell is added into the neighboring cell list, acquire signal transmission information from the new neighboring cell, and when a neighboring cell in the neighboring cell list is deleted, delete the signal transmission information corresponding to the deleted neighboring cell.

In some possible embodiments of the present disclosure, the signal interaction device further includes a first configuration module configured to configure a measurement parameter for the measurement of a signal from the neighboring cell for a UE in a serving cell in accordance with the signal transmission information from the neighboring cell.

In some possible embodiments of the present disclosure, the first configuration module is further configured to configure a measurement gap and/or a measurement period for the UE in the serving cell in accordance with the signal transmission information.

In still yet another aspect, the present disclosure provides in some embodiments a base station including the above-mentioned 5G-network signal interaction device. The signal interaction device is configured in a processor of the base station.

In still yet another aspect, the present disclosure provides in some embodiments a device for configuring one or more measurement parameters for use in a base station, including a second configuration module configured to configure the measurement parameter for the measurement of a signal from a neighboring cell for a UE in a serving cell in accordance with signal transmission information from the neighboring cell. The signal transmission information includes first information about the transmission of a synchronization signal and/or second information about the transmission of a reference signal for beam measurement.

In some possible embodiments of the present disclosure, the first information includes a scanning time and a scanning period for the transmission of the synchronization signal, and the second information includes a scanning time and a scanning period for the transmission of the reference signal for beam measurement.

In some possible embodiments of the present disclosure, the device further includes: a transmission module configured to transmit request information for requesting the signal transmission information to the neighboring cell; and a reception module configured to receive the signal transmission information transmitted by the neighboring cell in accordance with the request information.

In some possible embodiments of the present disclosure, the second configuration module includes: a first configuration unit configured to configure a measurement gap for the UE in the serving cell in accordance with the scanning time for the transmission of the synchronization signal and/or the scanning time for the transmission of the reference signal for beam measurement; and/or a second configuration unit configured to configure a measurement period for the UE in the serving cell in accordance with the scanning period for the transmission of the synchronization signal and/or the scanning period for the transmission of the reference signal for beam measurement.

In some possible embodiments of the present disclosure, the first configuration unit is further configured to: when the signal transmission information merely includes the first information, determine a sum of a maximum value of scanning times for the transmission of synchronization signals corresponding to all neighboring cells and a radio frequency channel adjustment time as the measurement gap of the UE; when the signal transmission information merely includes the second information, determine a sum of a maximum value of scanning times for the transmission of reference signals for beam measurement corresponding to all neighboring cells and the radio frequency channel adjustment time as the measurement gap of the UE; and when the signal transmission information includes both the first information and the second information, determine a sum of a maximum value of the scanning times for the transmission of the synchronization signals and the scanning times for the transmission of the reference signals for beam measurement corresponding to all neighboring cells and the radio frequency channel adjustment time as the measurement gap of the UE.

In some possible embodiments of the present disclosure, the second configuration unit is further configured to: when the signal transmission information merely includes the first information, determine a greatest common divisor or a least common multiple of scanning periods for the transmission of synchronization signals corresponding to all neighboring cells as the measurement period of the UE; when the signal transmission information merely includes the second information, determine a greatest common divisor or a least common multiple of scanning periods for the transmission of reference signal for beam measurement corresponding to all neighboring cells as the measurement period of the UE; and when the signal transmission information includes both the first information and the second information, determine a greatest common divisor or a least common multiple of the scanning periods for the transmission of the synchronization signals and the scanning periods for the transmission of the reference signals for beam measurement corresponding to all neighboring cells as the measurement period of the UE.

In still yet another aspect, the present disclosure provides in some embodiments a base station including the above-mentioned device for configuration the measurement parameter. The device is configured in a processor of the base station.

According to the embodiments of the present disclosure, the one or more measurement parameters for the measurement of the signal from the neighboring cell may be configured for the UE in the serving cell in accordance with the first information about the transmission of the synchronization signal and/or the second information about the transmission of the reference signal for beam measurement in the neighboring cell, so as to configure an optimal measurement parameter for the measurement of the signal from the neighboring cell for the UE in the serving cell. As a result, it is able for the UE to successfully receive the signal from the neighboring cell in accordance with the configured measurement parameter and measure the signal from the neighboring cell, thereby to reduce the system overhead while ensuring the measurement performance, and solve the problem in the related art where it is impossible for the conventional measurement gap configuration mechanism to ensure that the UE is capable of successfully receiving the signal from the neighboring cell.

DETAILED DESCRIPTION

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

In a 5G network, an analog beam is transmitted by a base station, and a direction of the analog beam is changed through beam scanning in a time division manner, so as to cover a cell. A synchronization signal or any other reference signal for beam measurement is transmitted in a time division manner. Hence, signal interaction needs to be performed between a serving cell and a neighboring cell so as to ensure that a UE in the serving cell is capable of successfully receiving the synchronization signal or the other reference signal for beam measurement from the neighboring cell.

The present disclosure provides in some embodiments a 5G-network signal interaction method for a base station, including acquiring signal transmission information from a neighboring cell. The signal transmission information includes first information about the transmission of a synchronization signal and/or second information about the transmission of a reference signal for beam measurement.

The reference signal for beam measurement may include various signals, e.g., a CSRS and a Channel State Information Reference Signal (CSI-RS).

To be specific, the first information may include a scanning time and a scanning period for the transmission of the synchronization signal, and the second information may include a scanning time and a scanning period for the transmission of the reference signal for beam measurement.

Figure 1:
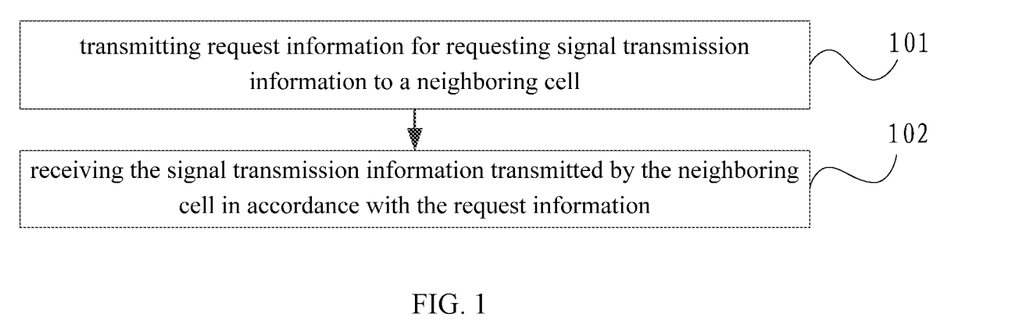
FIG. 1 is a flow chart of a step of acquiring signal transmission information from a neighboring cell according to some possible embodiments of the present disclosure.

To be specific, the acquiring the signal transmission information from the neighboring cell may include the following steps.

Step 101: transmitting request information for requesting the signal transmission information to the neighboring cell.

In this step, the base station may transmit the request information for requesting the signal transmission information to the neighboring cell. To be specific, a neighboring cell list may be set in advance, and the neighboring cells of a serving cell may be recorded in the neighboring cell list. At this time, the base station may transmit the request information for requesting the signal transmission information to all the neighboring cells in the neighboring cell list.

Step 102: receiving the signal transmission information transmitted by the neighboring cell in accordance with the request information.

In this step, upon the receipt of the request information from the base station, the neighboring cell may transmit the signal transmission information to the base station via an interface between base stations. At this time, the base station may receive the signal transmission information transmitted by the neighboring cell in accordance with the request information.

To be specific, the interface for transmitting the signal transmission information may be an interface between the base stations belonging to a same system (e.g., an interface between 5G base stations), or an interface between the base stations belonging to different systems (e.g., an interface between an LTE base station and a 5G base station).

Through the above steps, the base station may acquire the signal transmission information from the neighboring cell, so as to enable the UE in the serving cell to successfully receive the synchronization signal or the other reference signal for beam measurement from the neighboring cell.

In some possible embodiments of the present disclosure, subsequent to transmitting the signal transmission information to the base station via the interface between the base stations, the neighboring cell may mark the serving cell, so as to enable the neighboring cell to record the serving cell.

Figure 2:
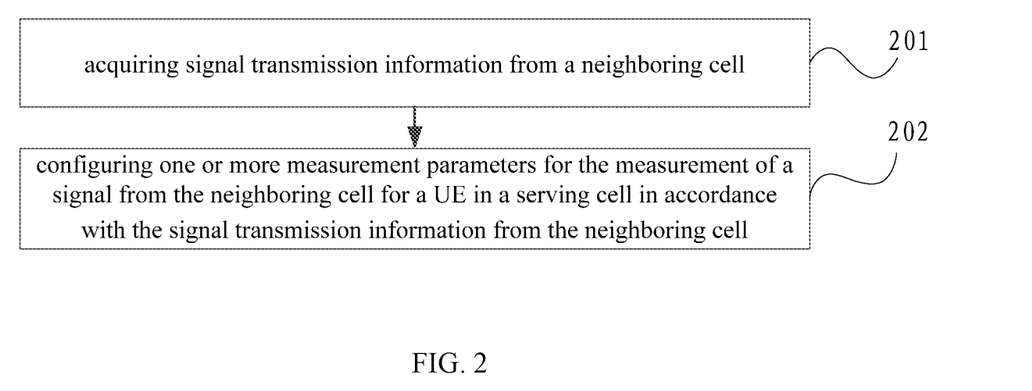
FIG. 2 is a flow chart of a 5G-network signal interaction method according to some possible embodiments of the present disclosure.

As shown in FIG. 2, the 5G-network signal interaction method may include the following steps.

Step 201: acquiring the signal transmission information from the neighboring cell.

To be specific, in this step, the neighboring cell may be recorded in the neighboring cell list. The base station may acquire the signal transmission information from all the neighboring cells in the neighboring cell list. When acquiring the signal transmission information from the neighboring cell, the base station may transmit the request information for requesting the signal transmission information to the neighboring cell, and then receive the signal transmission information transmitted by the neighboring cell in accordance with the request information.

In some possible embodiments of the present disclosure, subsequent to acquiring the signal transmission information from the neighboring cell, the signal interaction method may further include: determining whether the neighboring cells in the neighboring cell list are changed; when a new neighboring cell is added into the neighboring cell list, acquiring signal transmission information from the new neighboring cell; and when a neighboring cell in the neighboring cell list is deleted, deleting the signal transmission information corresponding to the deleted neighboring cell. In this way, the base station may acquire the signal transmission information from the new neighboring cell at any time, so as to ensure the base station to acquire the signal transmission information from all the neighboring cells. In addition, the base station may delete the signal transmission information corresponding to the deleted neighboring cell in real time, so as to ensure the validity of the signal transmission information recorded in the base station.

In some possible embodiments of the present disclosure, subsequent to acquiring the signal transmission information from the neighboring cell, update information about updated signal transmission information may also be received from the neighboring cell. In this way, the base station may accurately acquire the signal transmission information from the neighboring cell in real time. Of course, the base station may receive the update information about the updated signal transmission information from the neighboring cell via an interface between base stations. The interface may also be an interface between base stations belonging to a same system (e.g., an interface between the 5G base stations), or an interface between base stations belonging to different systems (e.g., an interface between the LTE base station and the 5G base station).

Step 202: configuring one or more measurement parameters for the measurement of a signal from the neighboring cell for the UE in the serving cell in accordance with the signal transmission information from the neighboring cell.

To be specific, in this step, the measurement parameter may include a measurement gap and/or a measurement period. When configuring the measurement parameter for the measurement of the signal from the neighboring cell for the UE in the serving cell in accordance with the signal transmission information from the neighboring cell, the measurement gap and/or the measurement period may be configured for the UE in the serving cell in accordance with the signal transmission information.

In some possible embodiments of the present disclosure, when configuring the measurement gap of the UE in the serving cell in accordance with the signal transmission information, the measurement gap may be configured for the UE in the serving cell in accordance with the scanning time for the transmission of the synchronization signal and/or the scanning time for the transmission of the reference signal for beam measurement. In addition, when configuring the measurement period of the UE in the serving cell in accordance with the signal transmission information, the measurement period of the UE in the serving cell may be configured in accordance with the scanning period for the transmission of the synchronization signal and/or the scanning period for the transmission of the reference signal for beam measurement.

In this regard, the measurement gap may be configured for the UE in the serving cell in accordance with the scanning time for the transmission of the synchronization signal and/or the scanning time for the transmission of the reference signal for beam measurement, and the measurement period may be configured to the UE in the serving cell in accordance with the scanning period for the transmission of the synchronization signal and/or the scanning period for the transmission of the reference signal for beam measurement, so as to enable the UE to successfully receive the synchronization signal or the reference signal for beam measurement from the neighboring within the measurement gap, thereby to ensure the measurement performance.

To be specific, when the measurement gap is configured for the UE in the serving cell in accordance with the scanning time for the transmission of the synchronization signal and/or the scanning time for the transmission of the reference signal for beam measurement, there may exist the following circumstances.

In a first circumstance, when the signal transmission information merely includes the first information, a sum of a maximum value of scanning times for the transmission of the synchronization signals corresponding to all neighboring cells and a radio frequency channel adjustment time may be determined as the measurement gap of the UE. For example, there are two neighboring cells, i.e., a first neighboring cell and a second neighboring cell, for the serving cell, a scanning time for the transmission of the synchronization signal corresponding to the first neighboring cell is 5 ms, a scanning time for the transmission of the synchronization signal corresponding to the second neighboring cell is 6 ms, and the radio frequency channel adjustment time is 1 ms. At this time, a sum of the scanning time for the transmission of the synchronization signal corresponding to the second neighboring cell and the radio frequency channel adjustment time, i.e., 7 ms, may be determined as the measurement gap of the UE. In this way, it is able for the UE in the serving cell to measure the synchronization signals from all the neighboring cells within the measurement gap.

In a second circumstance, when the signal transmission information merely includes the second information, a sum of a maximum value of scanning times for the transmission of the reference signals for beam measurement corresponding to all the neighboring cells and the radio frequency channel adjustment time may be determined as the measurement gap of the UE. For example, there are two neighboring cells, i.e., the first neighboring cell and the second neighboring cell, for the serving cell, the scanning time for the transmission of the reference signal for beam measurement corresponding to the first neighboring cell is A, and the scanning time for the transmission of the reference signal for beam measurement corresponding to the second neighboring cell is B, where B>A. At this time, a sum of the scanning time for the transmission of the reference signal for beam measurement corresponding to the second neighboring cell and the radio frequency channel adjustment time may be determined as the measurement gap of the UE. In this way, it is able for the UE in the serving cell to measure the reference signals for beam measurement from all the neighboring cells within the measurement gap.

In a third circumstance, when the signal transmission information includes both the first information and the second information, a sum of a maximum value of the scanning times for the transmission of the synchronization signals and the scanning times for the transmission of the reference signals for beam measurement corresponding to all the neighboring cells and the radio frequency channel adjustment time may be determined as the measurement gap of the UE. For example, there are two neighboring cells, i.e., the first neighboring cell and the second neighboring cell, for the serving cell, the scanning time for the transmission of the synchronization signal corresponding to the first neighboring cell is a, the scanning time for the transmission of the reference signal for beam measurement corresponding to the first neighboring cell is A, the scanning time for the transmission of the synchronization signal corresponding to the second neighboring cell is b, and the scanning time for the transmission of the reference signal for beam measurement corresponding to the second neighboring cell is B, where B>A>b>a. At this time, a sum of the scanning time for the transmission of the reference signal for beam measurement corresponding to the second neighboring cell and the radio frequency channel adjustment time may be determined as the measurement gap of the UE. The measurement gap is greater than the larger scanning time for the transmission of the reference signal for beam measurement, so it is able for the UE in the serving cell to measure the synchronization signals and the reference signals for beam measurement from all the neighboring cells within the measurement gap.

To be specific, when the measurement period is configured for the UE in the serving cell in accordance with the scanning period for the transmission of the synchronization signal and/or the scanning period for the transmission of the reference signal for beam measurement, there may exist the following circumstances.

In a first circumstance, when the signal transmission information merely includes the first information, a greatest common divisor or a least common multiple of scanning periods for the transmission of synchronization signals corresponding to all neighboring cells may be determined as the measurement period of the UE. For example, there are two neighboring cells, i.e., the first neighboring cell and the second neighboring cell, for the serving cell, the scanning period for the transmission of the synchronization signal corresponding to the first neighboring cell is 20 ms, and the scanning period for the transmission of the synchronization signal corresponding to the second neighboring cell is 30 ms. At this time, a greatest common divisor 10 ms or a least common multiple 60 ms of the scanning periods corresponding to all the neighboring cells may be acquired through calculation, and then determined as the measurement period. In this way, the measurement period of the UE may overlap the scanning periods for the transmission of the synchronization signals corresponding to all the neighboring cells, so it is able to ensure the measurement performance of the UE.

In a second circumstance, when the signal transmission information merely includes the second information, a greatest common divisor or a least common multiple of scanning periods for the transmission of reference signals for beam measurement corresponding to all neighboring cells may be determined as the measurement period of the UE. For example, there are two neighboring cells, i.e., the first neighboring cell and the second neighboring cell, for the serving cell, the scanning period for the transmission of the reference signals for beam measurement corresponding to the first neighboring cell is 10 ms, and the scanning period for the transmission of the reference signals for beam measurement corresponding to the second neighboring cell is 20 ms. At this time, a greatest common divisor 10 ms or a least common multiple 20 ms of the scanning periods corresponding to all the neighboring cells may be acquired through calculation, and then determined as the measurement period. In this way, the measurement period of the UE may overlap the scanning periods for the transmission of the reference signals for beam measurement corresponding to all the neighboring cells, so it is able to ensure the measurement performance of the UE.

In a third circumstance, when the signal transmission information includes both the first information and the second information, a greatest common divisor or a least common multiple of the scanning periods for the transmission of the synchronization signals and the scanning periods for the transmission of the reference signals for beam measurement corresponding to all neighboring cells may be determined as the measurement period of the UE. For example, there are two neighboring cells, i.e., the first neighboring cell and the second neighboring cell, for the serving cell, the scanning period for the transmission of the synchronization signal corresponding to the first neighboring cell is 20 ms, the scanning period for the transmission of the reference signal for beam measurement corresponding to the first neighboring cell is 10 ms, the scanning period for the transmission of the synchronization signal corresponding to the second neighboring cell is 30 ms, and the scanning period for the transmission of the reference signal for beam measurement corresponding to the second neighboring cell is 20 ms. At this time, a greatest common divisor 10 ms or a least common multiple 60 ms of the scanning periods corresponding to all the neighboring cells may be acquired through calculation, and then determined as the measurement period. In this way, the measurement period of the UE may overlap the scanning periods for the transmission of the synchronization signals and the scanning periods for the transmission of the reference signals for beam measurement corresponding to all the neighboring cells, so it is able to ensure the measurement performance of the UE.

In addition, through determining the greatest common divisor of the scanning periods corresponding to all the neighboring cells as the measurement period of the UE, it is able to increase the measurement intensity of the UE, thereby to measure more synchronization signals and/or more reference signals for beam measurement from the neighboring cell. Through determining the least common multiple of the scanning periods corresponding to all the neighboring cells as the measurement period of the UE, it is able to reduce the system overhead when measuring the synchronization signals and/or the reference signals for beam measurement corresponding to all the neighboring cells.

According to the embodiments of the present disclosure, the signal transmission information may be acquired from the neighboring cell, so that the UE in the serving cell may acquire the first information about the transmission of the synchronization signals and/or the second information about the transmission of the reference signals for beam measurement from all the neighboring cells. Then, the measurement gap and/or the measurement period may be configured for the UE in the serving cell in accordance with the signal transmission information, so as to configure an optimal measurement gap and an optical measurement period for measuring the signal from the neighboring cell for the UE in the serving cell. As a result, it is able for the UE to successfully receive the signal from the neighboring cell in accordance with the configured measurement parameter and measure the signal from the neighboring cell, thereby to reduce the system overhead while ensuring the measurement performance, and solve the problem in the related art where it is impossible for the conventional measurement gap configuration mechanism to ensure that the UE is capable of successfully receiving the signal from the neighboring cell.

The present disclosure further provides in some embodiments a method for configuring one or more measurement parameters for use in a base station, including configuring the measurement parameter for the measurement of a signal from a neighboring cell for a UE in a serving cell in accordance with signal transmission information from the neighboring cell. The signal transmission information includes first information about the transmission of a synchronization signal and/or second information about the transmission of a reference signal for beam measurement.

According to the embodiments of the present disclosure, the measurement parameter for the measurement of the signal from the neighboring cell may be configured for the UE in the serving cell in accordance with the first information about the transmission of the synchronization signal and/or the second information about the transmission of the reference signal for beam measurement, so as to configure an optimal measurement parameter for the measurement of the signal from the neighboring cell for the UE in the serving cell. As a result, it is able for the UE to successfully receive the signal from the neighboring cell in accordance with the configured measurement parameter and measure the signal from the neighboring cell, thereby to reduce the system overhead while ensuring the measurement performance, and solve the problem in the related art where it is impossible for the conventional measurement gap configuration mechanism to ensure that the UE is capable of successfully receiving the signal from the neighboring cell.

The reference signal for beam measurement may include various signals, e.g., a CSRS and a CSI-RS.

To be specific, the first information may include a scanning time and a scanning period for the transmission of the synchronization signal, and the second information may include a scanning time and a scanning period for the transmission of the reference signal for beam measurement.

Figure 3:
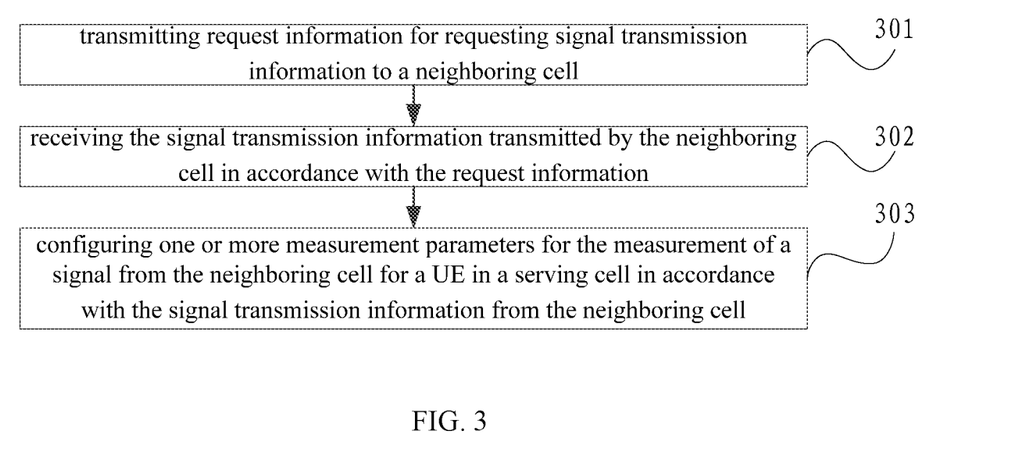
FIG. 3 is a flow chart of a method for configuring one or more measurement parameters.

As shown in FIG. 3, the method for configuring the measurement parameter may include the following steps.

Step 301: transmitting request information for requesting the signal transmission information to the neighboring cell.

To be specific, during the configuration of the measurement parameter, the signal transmission information may be acquired from the neighboring cell at first. In this step, the base station may transmit the request information for requesting the signal transmission information to the neighboring cell.

To be specific, a neighboring cell list may be set in advance, and the neighboring cells of the serving cell may be recorded in the neighboring cell list. At this time, the base station may transmit the request information for requesting the signal transmission information to all the neighboring cells in the neighboring cell list.

Step 302: receiving the signal transmission information transmitted by the neighboring cell in accordance with the request information.

In this step, upon the receipt of the request information from the base station, the neighboring cell may transmit the signal transmission information to the base station via an interface between base stations. At this time, the base station may receive the signal transmission information transmitted by the neighboring cell in accordance with the request information.

In some possible embodiments of the present disclosure, the interface for transmitting the signal transmission information may be an interface between the base stations belonging to a same system (e.g., an interface between 5G base stations), or an interface between the base stations belonging to different systems (e.g., an interface between an LTE base station and a 5G base station).

In some possible embodiments of the present disclosure, subsequent to transmitting the signal transmission information to the base station via the interface between the base stations, the neighboring cell may mark the serving cell, so as to enable the neighboring cell to record the serving cell.

In some possible embodiments of the present disclosure, the method may further include: determining whether the neighboring cells in the neighboring cell list are changed; when a new neighboring cell is added into the neighboring cell list, acquiring signal transmission information from the new neighboring cell; and when a neighboring cell in the neighboring cell list is deleted, deleting the signal transmission information corresponding to the deleted neighboring cell. In this way, the base station may acquire the signal transmission information from the new neighboring cell at any time, so as to ensure the base station to acquire the signal transmission information from all the neighboring cells. In addition, the base station may delete the signal transmission information corresponding to the deleted neighboring cell in real time, so as to ensure the validity of the signal transmission information recorded in the base station.

In some possible embodiments of the present disclosure, the base station may further receive update information about updated signal transmission information from the neighboring cell. In this way, the base station may accurately acquire the signal transmission information from the neighboring cell in real time. Of course, the base station may receive the update information about the updated signal transmission information from the neighboring cell via an interface between base stations. The interface may also be an interface between base stations belonging to a same system (e.g., an interface between the 5G base stations), or an interface between base stations belonging to different systems (e.g., an interface between the LTE base station and the 5G base station).

Step 303: configuring the measurement parameter for the measurement of a signal from the neighboring cell for the UE in the serving cell in accordance with the signal transmission information from the neighboring cell.

To be specific, in this step, the measurement parameter may include a measurement gap and/or a measurement period.

The configuring the measurement parameter for the measurement of the signal from the neighboring cell for the UE in the serving cell in accordance with the signal transmission information from the neighboring cell may include: configuring the measurement gap for the UE in the serving cell in accordance with the scanning time for the transmission of the synchronization signal and/or the scanning time for the transmission of the reference signal for beam measurement; and/or configuring the measurement period for the UE in the serving cell in accordance with the scanning period for the transmission of the synchronization signal and/or the scanning period for the transmission of the reference signal for beam measurement.

In this regard, the measurement gap may be configured for the UE in the serving cell in accordance with the scanning time for the transmission of the synchronization signal and/or the scanning time for the transmission of the reference signal for beam measurement, and the measurement period may be configured to the UE in the serving cell in accordance with the scanning period for the transmission of the synchronization signal and/or the scanning period for the transmission of the reference signal for beam measurement, so as to enable the UE to successfully receive the synchronization signal or the reference signal for beam measurement from the neighboring within the measurement gap, thereby to ensure the measurement performance.

In some possible embodiments of the present disclosure, when the measurement gap is configured for the UE in the serving cell in accordance with the scanning time for the transmission of the synchronization signal and/or the scanning time for the transmission of the reference signal for beam measurement, there may exist the following circumstances.

In a first circumstance, when the signal transmission information merely includes the first information, a sum of a maximum value of scanning times for the transmission of the synchronization signals corresponding to all neighboring cells and a radio frequency channel adjustment time may be determined as the measurement gap of the UE. For example, there are two neighboring cells, i.e., a first neighboring cell and a second neighboring cell, for the serving cell, a scanning time for the transmission of the synchronization signal corresponding to the first neighboring cell is 5 ms, a scanning time for the transmission of the synchronization signal corresponding to the second neighboring cell is 6 ms, and the radio frequency channel adjustment time is 1 ms. At this time, a sum of the scanning time for the transmission of the synchronization signal corresponding to the second neighboring cell and the radio frequency channel adjustment time, i.e., 7 ms, may be determined as the measurement gap of the UE. In this way, it is able for the UE in the serving cell to measure the synchronization signals from all the neighboring cells within the measurement gap.

In a second circumstance, when the signal transmission information merely includes the second information, a sum of a maximum value of scanning times for the transmission of the reference signals for beam measurement corresponding to all the neighboring cells and the radio frequency channel adjustment time may be determined as the measurement gap of the UE. For example, there are two neighboring cells, i.e., the first neighboring cell and the second neighboring cell, for the serving cell, the scanning time for the transmission of the reference signal for beam measurement corresponding to the first neighboring cell is A, and the scanning time for the transmission of the reference signal for beam measurement corresponding to the second neighboring cell is B, where B>A. At this time, a sum of the scanning time for the transmission of the reference signal for beam measurement corresponding to the second neighboring cell and the radio frequency channel adjustment time may be determined as the measurement gap of the UE. In this way, it is able for the UE in the serving cell to measure the reference signals for beam measurement from all the neighboring cells within the measurement gap.

In a third circumstance, when the signal transmission information includes both the first information and the second information, a sum of a maximum value of the scanning times for the transmission of the synchronization signals and the scanning times for the transmission of the reference signals for beam measurement corresponding to all the neighboring cells and the radio frequency channel adjustment time may be determined as the measurement gap of the UE. For example, there are two neighboring cells, i.e., the first neighboring cell and the second neighboring cell, for the serving cell, the scanning time for the transmission of the synchronization signal corresponding to the first neighboring cell is a, the scanning time for the transmission of the reference signal for beam measurement corresponding to the first neighboring cell is A, the scanning time for the transmission of the synchronization signal corresponding to the second neighboring cell is b, and the scanning time for the transmission of the reference signal for beam measurement corresponding to the second neighboring cell is B, where B>A>b>a. At this time, a sum of the scanning time for the transmission of the reference signal for beam measurement corresponding to the second neighboring cell and the radio frequency channel adjustment time may be determined as the measurement gap of the UE. The measurement gap is greater than the larger scanning time for the transmission of the reference signal for beam measurement, so it is able for the UE in the serving cell to measure the synchronization signals and the reference signals for beam measurement from all the neighboring cells within the measurement gap.

In addition, in some possible embodiments of the present disclosure, when the measurement period is configured for the UE in the serving cell in accordance with the scanning period for the transmission of the synchronization signal and/or the scanning period for the transmission of the reference signal for beam measurement, there may exist the following circumstances.

In a first circumstance, when the signal transmission information merely includes the first information, a greatest common divisor or a least common multiple of scanning periods for the transmission of synchronization signals corresponding to all neighboring cells may be determined as the measurement period of the UE. For example, there are two neighboring cells, i.e., the first neighboring cell and the second neighboring cell, for the serving cell, the scanning period for the transmission of the synchronization signal corresponding to the first neighboring cell is 20 ms, and the scanning period for the transmission of the synchronization signal corresponding to the second neighboring cell is 30 ms. At this time, a greatest common divisor 10 ms or a least common multiple 60 ms of the scanning periods corresponding to all the neighboring cells may be acquired through calculation, and then determined as the measurement period. In this way, the measurement period of the UE may overlap the scanning periods for the transmission of the synchronization signals corresponding to all the neighboring cells, so it is able to ensure the measurement performance of the UE.

In a second circumstance, when the signal transmission information merely includes the second information, a greatest common divisor or a least common multiple of scanning periods for the transmission of reference signals for beam measurement corresponding to all neighboring cells may be determined as the measurement period of the UE. For example, there are two neighboring cells, i.e., the first neighboring cell and the second neighboring cell, for the serving cell, the scanning period for the transmission of the reference signals for beam measurement corresponding to the first neighboring cell is 10 ms, and the scanning period for the transmission of the reference signals for beam measurement corresponding to the second neighboring cell is 20 ms. At this time, a greatest common divisor 10 ms or a least common multiple 20 ms of the scanning periods corresponding to all the neighboring cells may be acquired through calculation, and then determined as the measurement period. In this way, the measurement period of the UE may overlap the scanning periods for the transmission of the reference signals for beam measurement corresponding to all the neighboring cells, so it is able to ensure the measurement performance of the UE.

In a third circumstance, when the signal transmission information includes both the first information and the second information, a greatest common divisor or a least common multiple of the scanning periods for the transmission of the synchronization signals and the scanning periods for the transmission of the reference signals for beam measurement corresponding to all neighboring cells may be determined as the measurement period of the UE. For example, there are two neighboring cells, i.e., the first neighboring cell and the second neighboring cell, for the serving cell, the scanning period for the transmission of the synchronization signal corresponding to the first neighboring cell is 20 ms, the scanning period for the transmission of the reference signal for beam measurement corresponding to the first neighboring cell is 10 ms, the scanning period for the transmission of the synchronization signal corresponding to the second neighboring cell is 30 ms, and the scanning period for the transmission of the reference signal for beam measurement corresponding to the second neighboring cell is 20 ms. At this time, a greatest common divisor 10 ms or a least common multiple 60 ms of the scanning periods corresponding to all the neighboring cells may be acquired through calculation, and then determined as the measurement period. In this way, the measurement period of the UE may overlap the scanning periods for the transmission of the synchronization signals and the scanning periods for the transmission of the reference signals for beam measurement corresponding to all the neighboring cells, so it is able to ensure the measurement performance of the UE.

In addition, through determining the greatest common divisor of the scanning periods corresponding to all the neighboring cells as the measurement period of the UE, it is able to increase the measurement intensity of the UE, thereby to measure more synchronization signals and/or more reference signals for beam measurement from the neighboring cell. Through determining the least common multiple of the scanning periods corresponding to all the neighboring cells as the measurement period of the UE, it is able to reduce the system overhead when measuring the synchronization signals and/or the reference signals for beam measurement corresponding to all the neighboring cells.

According to the embodiments of the present disclosure, the measurement parameter for the measurement of the signal from the neighboring cell may be configured for the UE in the serving cell in accordance with the signal transmission information from the neighboring cell, so as to configure an optimal measurement gap and/or an optimal measurement period for the measurement of the signal from the neighboring cell for the UE in the serving cell. As a result, it is able for the UE to successfully receive the signal from the neighboring cell in accordance with the configured measurement parameter and measure the signal from the neighboring cell, thereby to reduce the system overhead while ensuring the measurement performance, and solve the problem in the related art where it is impossible for the conventional measurement gap configuration mechanism to ensure that the UE is capable of successfully receiving the signal from the neighboring cell.

Figure 4:
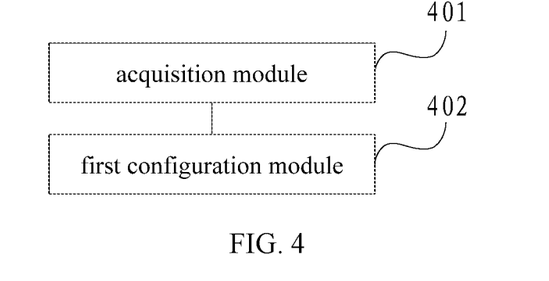
FIG. 4 is a block diagram of a 5G-network signal interaction device according to some possible embodiments of the present disclosure.

The present disclosure further provides in some embodiments a 5G-network signal interaction device for a base station which, as shown in FIG. 4, includes an acquisition module 401 configured to acquire signal transmission information from a neighboring cell. The signal transmission information includes first information about the transmission of a synchronization signal and/or second information about the transmission of a reference signal for beam measurement.

In some possible embodiments of the present disclosure, the first information may include a scanning time and a scanning period for the transmission of the synchronization signal, and the second information may include a scanning time and a scanning period for the transmission of the reference signal for beam measurement.

In some possible embodiments of the present disclosure, the acquisition module 401 may include: a transmission unit configured to transmit request information for requesting the signal transmission information to the neighboring cell; and a reception unit configured to receive the signal transmission information transmitted by the neighboring cell in accordance with the request information.

In some possible embodiments of the present disclosure, the neighboring cell may be recorded in a neighboring cell list. The signal interaction device may further include: a determination module configured to determine whether neighboring cells in the neighboring cell list change; and an information processing module configured to, when a new neighboring cell is added into the neighboring cell list, acquire signal transmission information from the new neighboring cell, and when a neighboring cell in the neighboring cell list is deleted, delete the signal transmission information corresponding to the deleted neighboring cell.

In some possible embodiments of the present disclosure, the signal interaction device further includes a first configuration module 402 configured to configure a measurement parameter for the measurement of a signal from the neighboring cell for a UE in a serving cell in accordance with the signal transmission information from the neighboring cell.

In some possible embodiments of the present disclosure, the first configuration module 402 is further configured to configure a measurement gap and/or a measurement period for the UE in the serving cell in accordance with the signal transmission information.

According to the embodiments of the present disclosure, the measurement parameter for the measurement of the signal from the neighboring cell may be configured for the UE in the serving cell in accordance with the first information about the transmission of the synchronization signal and/or the second information about the transmission of the reference signal for beam measurement, so as to configure an optimal measurement parameter for the measurement of the signal from the neighboring cell for the UE in the serving cell. As a result, it is able for the UE to successfully receive the signal from the neighboring cell in accordance with the configured measurement parameter and measure the signal from the neighboring cell, thereby to reduce the system overhead while ensuring the measurement performance, and solve the problem in the related art where it is impossible for the conventional measurement gap configuration mechanism to ensure that the UE is capable of successfully receiving the signal from the neighboring cell.

The present disclosure further provides in some embodiments a base station which includes the above-mentioned 5G-network signal interaction device. The signal interaction device may be configured in a processor of the base station. The base station may further include such members as a memory, and the memory is configured to store therein data for the operation of the processor.

Figure 5:
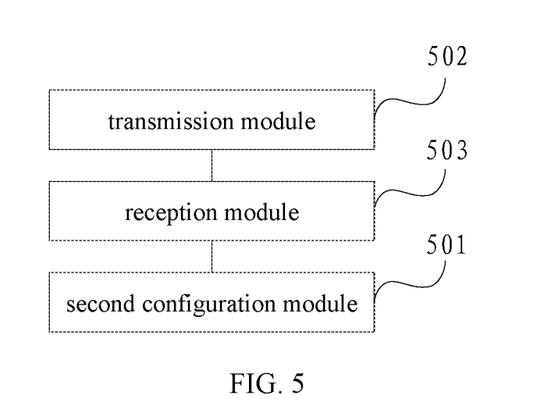
FIG. 5 is a block diagram of a device for measuring a measurement parameter according to some possible embodiments of the present disclosure.

The present disclosure further provides in some embodiments a device for configuring one or more measurement parameters for use in a base station which, as shown in FIG. 5, includes a second configuration module 501 configured to configure the measurement parameter for the measurement of a signal from a neighboring cell for a UE in a serving cell in accordance with signal transmission information from the neighboring cell. The signal transmission information includes first information about the transmission of a synchronization signal and/or second information about the transmission of a reference signal for beam measurement.

In some possible embodiments of the present disclosure, the first information may include a scanning time and a scanning period for the transmission of the synchronization signal, and the second information may include a scanning time and a scanning period for the transmission of the reference signal for beam measurement.

In some possible embodiments of the present disclosure, the device further includes: a transmission module 502 configured to transmit request information for requesting the signal transmission information to the neighboring cell; and a reception module 503 configured to receive the signal transmission information transmitted by the neighboring cell in accordance with the request information.

In some possible embodiments of the present disclosure, the second configuration module 501 may include: a first configuration unit configured to configure a measurement gap for the UE in the serving cell in accordance with the scanning time for the transmission of the synchronization signal and/or the scanning time for the transmission of the reference signal for beam measurement; and/or a second configuration unit configured to configure a measurement period for the UE in the serving cell in accordance with the scanning period for the transmission of the synchronization signal and/or the scanning period for the transmission of the reference signal for beam measurement.

In some possible embodiments of the present disclosure, the first configuration unit is further configured to: when the signal transmission information merely includes the first information, determine a sum of a maximum value of scanning times for the transmission of synchronization signals corresponding to all neighboring cells and a radio frequency channel adjustment time as the measurement gap of the UE; when the signal transmission information merely includes the second information, determine a sum of a maximum value of scanning times for the transmission of reference signals for beam measurement corresponding to all neighboring cells and the radio frequency channel adjustment time as the measurement gap of the UE; and when the signal transmission information includes both the first information and the second information, determine a sum of a maximum value of the scanning times for the transmission of the synchronization signals and the scanning times for the transmission of the reference signals for beam measurement corresponding to all neighboring cells and the radio frequency channel adjustment time as the measurement gap of the UE.

In some possible embodiments of the present disclosure, the second configuration unit is further configured to: when the signal transmission information merely includes the first information, determine a greatest common divisor or a least common multiple of scanning periods for the transmission of synchronization signals corresponding to all neighboring cells as the measurement period of the UE; when the signal transmission information merely includes the second information, determine a greatest common divisor or a least common multiple of scanning periods for the transmission of reference signal for beam measurement corresponding to all neighboring cells as the measurement period of the UE; and when the signal transmission information includes both the first information and the second information, determine a greatest common divisor or a least common multiple of the scanning periods for the transmission of the synchronization signals and the scanning periods for the transmission of the reference signals for beam measurement corresponding to all neighboring cells as the measurement period of the UE.

According to the embodiments of the present disclosure, the measurement parameter for the measurement of the signal from the neighboring cell may be configured for the UE in the serving cell in accordance with the signal transmission information from the neighboring cell, so as to configure an optimal measurement gap and/or an optimal measurement period for the measurement of the signal from the neighboring cell for the UE in the serving cell. As a result, it is able for the UE to successfully receive the signal from the neighboring cell in accordance with the configured measurement parameter and measure the signal from the neighboring cell, thereby to reduce the system overhead while ensuring the measurement performance, and solve the problem in the related art where it is impossible for the conventional measurement gap configuration mechanism to ensure that the UE is capable of successfully receiving the signal from the neighboring cell.

The present disclosure further provides in some embodiments a base station including the above-mentioned device for configuring the measurement parameter. The device may be configured in a processor of the base station. The base station may further include such members as a memory, and the memory is configured to store therein data for the operation of the processor.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A $5^{th}$-Generation (5G)-network signal interaction method realized by a base station in a serving cell, comprising:
    acquiring signal transmission information from another base station in a neighboring cell, wherein the signal transmission information comprises first information about the transmission of a synchronization signal from the neighboring cell and/or second information about the transmission of a reference signal for beam measurement from the neighboring cell,
    wherein the first information comprises a scanning time and a scanning period for the transmission of the synchronization signal from the neighboring cell, and the second information comprises a scanning time and a scanning period for the transmission of the reference signal for beam measurement from the neighboring cell.

2. The signal interaction method according to claim 1, wherein the acquiring the signal transmission information from another base station in the neighboring cell comprises: transmitting request information for requesting the signal transmission information to the other base station in the neighboring cell; and receiving the signal transmission information transmitted by the other base station in the neighboring cell in accordance with the request information.

3. The signal interaction method according to claim 1, wherein the neighboring cell is recorded in a neighboring cell list, wherein the signal interaction method further comprises:
    determining whether neighboring cells in the neighboring cell list are changed;
    when a new neighboring cell is added into the neighboring cell list, acquiring signal transmission information from the new neighboring cell; and
    when a neighboring cell in the neighboring cell list is deleted, deleting the signal transmission information corresponding to the deleted neighboring cell.

4. The signal interaction method according to claim 1, wherein subsequent to acquiring the signal transmission information from the other base station in the neighboring cell, the signal interaction method further comprises:
    configuring one or more measurement parameters for the measurement of a signal from the other base station in the neighboring cell for a User Equipment (UE) in the serving cell in accordance with the signal transmission information from the other base station in the neighboring cell.

5. The signal interaction method according to claim 4, wherein the configuring the measurement parameter for the measurement of a signal from the other base station in the neighboring cell for the UE in the serving cell in accordance with the signal transmission information from the other base station in the neighboring cell comprises:
    configuring a measurement gap and/or a measurement period for the UE in the serving cell in accordance with the signal transmission information.

6. A method for configuring one or more measurement parameters for use in a base station in a serving cell, comprising:
    configuring the measurement parameter for the measurement of a signal from another base station in a neighboring cell for a User Equipment (UE) in the serving cell in accordance with signal transmission information from the other base station in the neighboring cell,
    wherein the signal transmission information comprises first information about the transmission of a synchronization signal from the neighboring cell and/or second information about the transmission of a reference signal for beam measurement from the neighboring cell,
    wherein the first information comprises a scanning time and a scanning period for the transmission of the synchronization signal from the neighboring cell, and the second information comprises a scanning time and a scanning period for the transmission of the reference signal for beam measurement from the neighboring cell.

7. The method according to claim 6, further comprising:
    transmitting request information for requesting the signal transmission information to the other base station in the neighboring cell; and
    receiving the signal transmission information transmitted by the other base station in the neighboring cell in accordance with the request information.

8. The method according to claim 6, wherein the configuring the measurement parameter for the measurement of the signal from another base station in the neighboring cell for the UE in the serving cell in accordance with the signal transmission information from the other base station in the neighboring cell comprises:
    configuring a measurement gap for the UE in the serving cell in accordance with the scanning time for the transmission of the synchronization signal and/or the scanning time for the transmission of the reference signal for beam measurement from the neighboring cell; and/or
    configuring a measurement period for the UE in the serving cell in accordance with the scanning period for the transmission of the synchronization signal and/or the scanning period for the transmission of the reference signal for beam measurement from the neighboring cell.

9. The method according to claim 8, wherein the configuring the measurement gap for the UE in the serving cell in accordance with the scanning time for the transmission of the synchronization signal and/or the scanning time for the transmission of the reference signal for beam measurement from the neighboring cell comprises:
    when the signal transmission information merely comprises the first information, determining a sum of a maximum value of scanning times for the transmission of synchronization signals corresponding to all neighboring cells and a radio frequency channel adjustment time as the measurement gap of the UE;

when the signal transmission information merely comprises the second information, determining a sum of a maximum value of scanning times for the transmission of reference signals for beam measurement corresponding to all neighboring cells and the radio frequency channel adjustment time as the measurement gap of the UE; and when the signal transmission information comprises both the first information and the second information, determining a sum of a maximum value of the scanning times for the transmission of the synchronization signals and the scanning times for the transmission of the reference signals for beam measurement corresponding to all neighboring cells and the radio frequency channel adjustment time as the measurement gap of the UE.

10. The method according to claim 8, wherein the configuring the measurement period for the UE in the serving cell in accordance with the scanning period for the transmission of the synchronization signal and/or the scanning period for the transmission of the reference signal for beam measurement from the neighboring cell comprises:

when the signal transmission information merely comprises the first information, determining a greatest common divisor or a least common multiple of scanning periods for the transmission of synchronization signals corresponding to all neighboring cells as the measurement period of the UE;

when the signal transmission information merely comprises the second information, determining a greatest common divisor or a least common multiple of scanning periods for the transmission of reference signal for beam measurement corresponding to all neighboring cells as the measurement period of the UE; and when the signal transmission information comprises both the first information and the second information, determining a greatest common divisor or a least common multiple of the scanning periods for the transmission of the synchronization signals and the scanning periods for the transmission of the reference signals for beam measurement corresponding to all neighboring cells as the measurement period of the UE.

11. A base station, comprising a processor, a memory, and a computer program stored in the memory and executed by the processor, wherein the processor is configured to execute the computer program so as to implement the $5^{th}$-Generation (5G)-network signal interaction method realized by the base station according to claim 1.

12. A base station, comprising a processor, a memory, and a computer program stored in the memory and executed by the processor, wherein the processor is configured to execute the computer program so as to implement a method for configuring one or more measurement parameters for use in a base station in a serving cell, comprising:

configuring the measurement parameter for the measurement of a signal from another base station in a neighboring cell for a User Equipment (UE) in the serving cell in accordance with signal transmission information from the other base station in the neighboring cell, wherein the signal transmission information comprises first information about the transmission of a synchronization signal from the neighboring cell and/or second information about the transmission of a reference signal for beam measurement from the neighboring cell, wherein the first information comprises a scanning time and a scanning period for the transmission of the synchronization signal from the neighboring cell, and the second information comprises a scanning time and a scanning period for the transmission of the reference signal for beam measurement from the neighboring cell.

13. The base station according to claim 11, wherein the first information comprises a scanning time and a scanning period for the transmission of the synchronization signal from the neighboring cell, and the second information comprises a scanning time and a scanning period for the transmission of the reference signal for beam measurement from the neighboring cell.

14. The base station according to claim 11, wherein the acquiring the signal transmission information from another base station in the neighboring cell comprises: transmitting request information for requesting the signal transmission information to the other base station in the neighboring cell; and receiving the signal transmission information transmitted by the other base station in the neighboring cell in accordance with the request information.

15. The base station according to claim 11, wherein the neighboring cell is recorded in a neighboring cell list, wherein the signal interaction method further comprises:

determining whether neighboring cells in the neighboring cell list are changed;

when a new neighboring cell is added into the neighboring cell list, acquiring signal transmission information from the new neighboring cell; and when a neighboring cell in the neighboring cell list is deleted, deleting the signal transmission information corresponding to the deleted neighboring cell.

16. The base station according to claim 11, wherein subsequent to acquiring the signal transmission information from the other base station in the neighboring cell, the signal interaction method further comprises:

configuring one or more measurement parameters for the measurement of a signal from the other base station in the neighboring cell for a User Equipment (UE) in a serving cell in accordance with the signal transmission information from the other base station in the neighboring cell.

17. The base station according to claim 16, wherein the configuring the measurement parameter for the measurement of a signal from the other base station in the neighboring cell for the UE in the serving cell in accordance with the signal transmission information from the other base station in the neighboring cell comprises:

configuring a measurement gap and/or a measurement period for the UE in the serving cell in accordance with the signal transmission information.

\* \* \* \* \*